Figure 1:
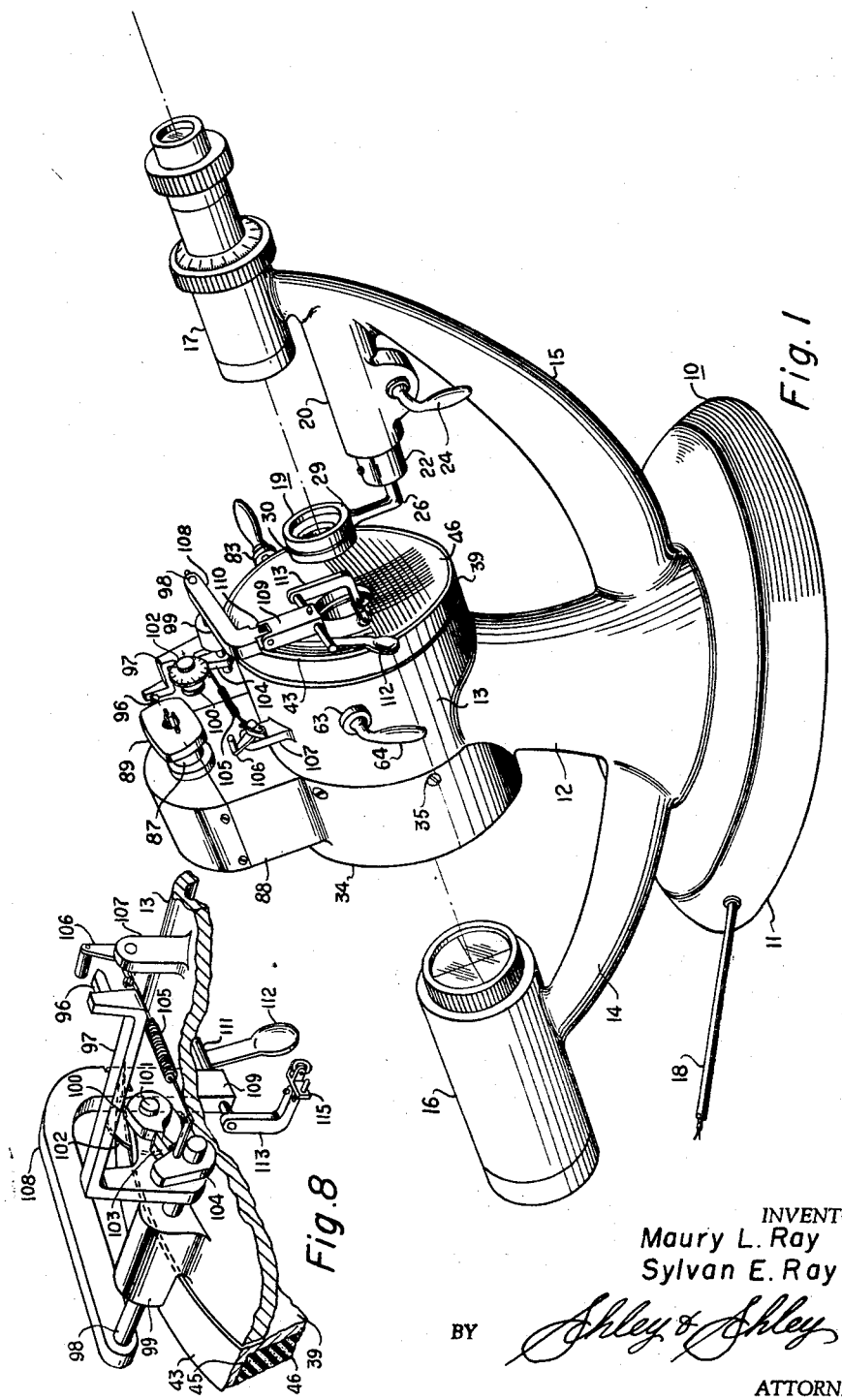

March 29, 1960

S. E. RAY ET AL 2,930,130

OPTICAL LENS SCRIBER

Filed March 22, 1957

4 Sheets-Sheet 1

INVENTORS
Maury L. Ray
Sylvan E. Ray

BY *Ashley & Ashley*

ATTORNEYS

March 29, 1960

S. E. RAY ET AL 2,930,130

OPTICAL LENS SCRIBER

Filed March 22, 1957

4 Sheets-Sheet 2

INVENTORS
Maury L. Ray
Sylvan E. Ray

BY *Ashley & Ashley*

ATTORNEYS

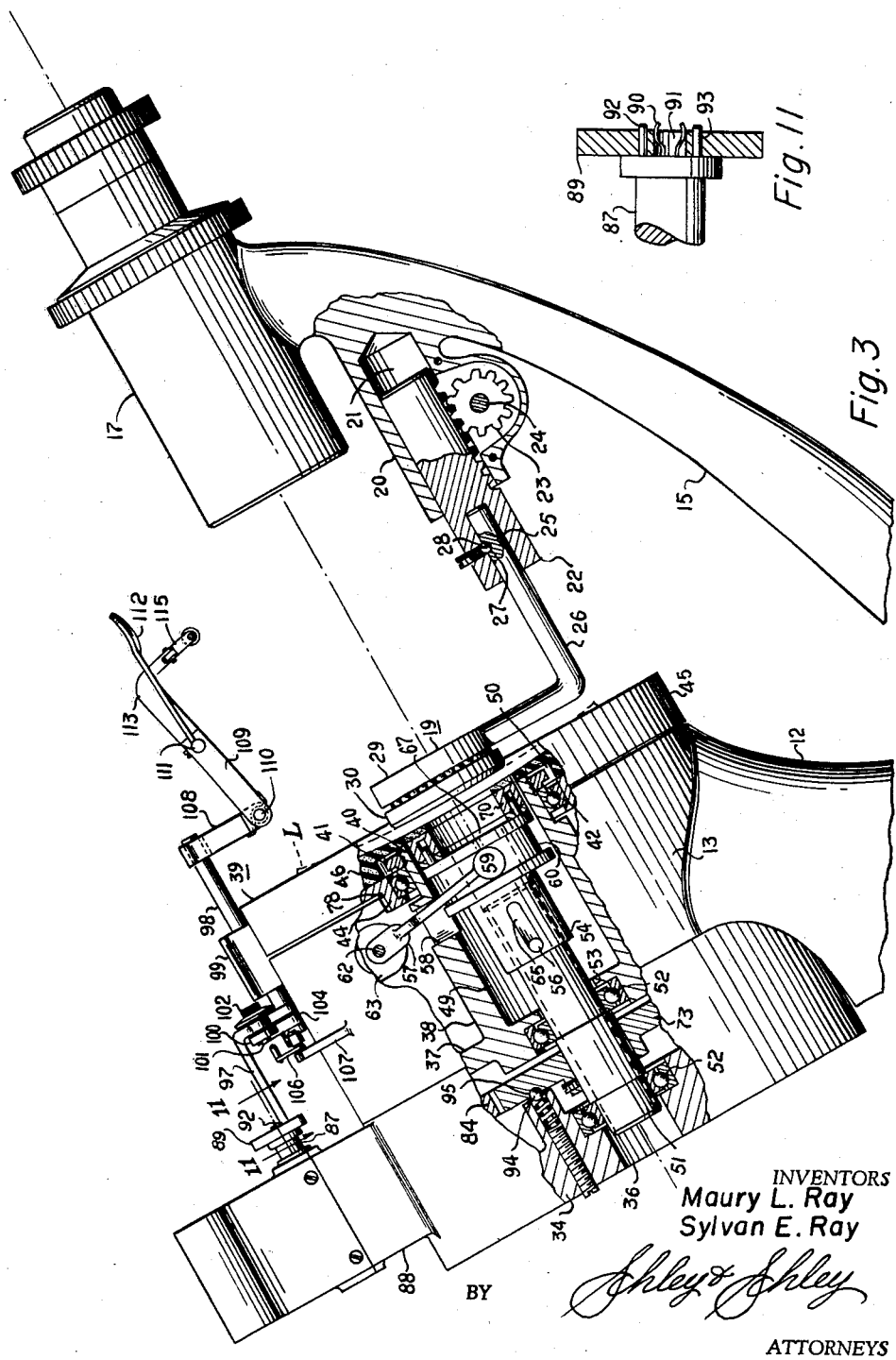

March 29, 1960 S. E. RAY ET AL 2,930,130
OPTICAL LENS SCRIBER
Filed March 22, 1957 4 Sheets-Sheet 4

INVENTORS
Maury L. Ray
Sylvan E. Ray

BY Ashley & Ashley
ATTORNEYS

United States Patent Office 2,930,130
Patented Mar. 29, 1960

2,930,130

OPTICAL LENS SCRIBER

Sylvan E. Ray and Maury L. Ray, Dallas, Tex.

Application March 22, 1957, Serial No. 647,817

7 Claims. (Cl. 33—28)

This invention relates to new and useful improvements in optical lens scribers.

Heretofore, the scribing and edging of prescription lenses have involved the duplication of several operations which are time-consuming and which are conducive to mistakes. Previously, it has been necessary to aline the horizontal axis of the lens with a lens meter, dot the lens along this axis, aline the dots on a lens marking device and aline the marked line on a scriber. After scribing, the lens must be chipped and its marked line alined on a chuck for mounting in an automatic edger. Accuracy is difficult to obtain since manual or visual alinement is employed in all of the steps following the dotting of the lens and its removal from the lens meter. In addition, the manual or visual alinements are usually performed by different persons whereby the inaccuracy is likely to be compounded or magnified.

Accordingly, one object of the invention is to provide improved means for scribing an optical lens which is of such construction that the necessity for realining, dotting, marking and manual chucking of the lens is eliminated whereby the lens may be quickly and efficaciously scribed and edged.

Another object of the invention is to provide an improved optical lens scribing instrument which is so constructed that a lens may be "laid out" or positioned and chucked optically so as to obviate mechanical errors by the person or persons scribing and edging the lens.

An important object of the invention is to provide an improved optical lens scriber having novel chuck means which is adapted to be attached to a lens prior to the scribing thereof and which is removable with the scribed lens for positioning the same in an automatic adger whereby it is unnecessary to mark or realine the lens or manually chuck the same.

A particular object of the invention is to provide an optical lens scriber, of the character described, which includes the operations of neutralization or checking the focal power of a lens, laying out the decentration of a bifocal or trifocal lens, scribing of the lens and chucking of the lens for edging whereby the completed lens more accurately conforms to the prescription and less time is required for such completion.

A further object of the invention is to provide an improved lens scriber, of the character described, wherein its greater accuracy permits a lens to be scribed within closer tolerances to the finished size so that less glass need be removed by the edger and the edging time is appreciably reduced.

A construction designed to carry out the invention will be hereinafter described, together with other features of the invention.

Figure 2:
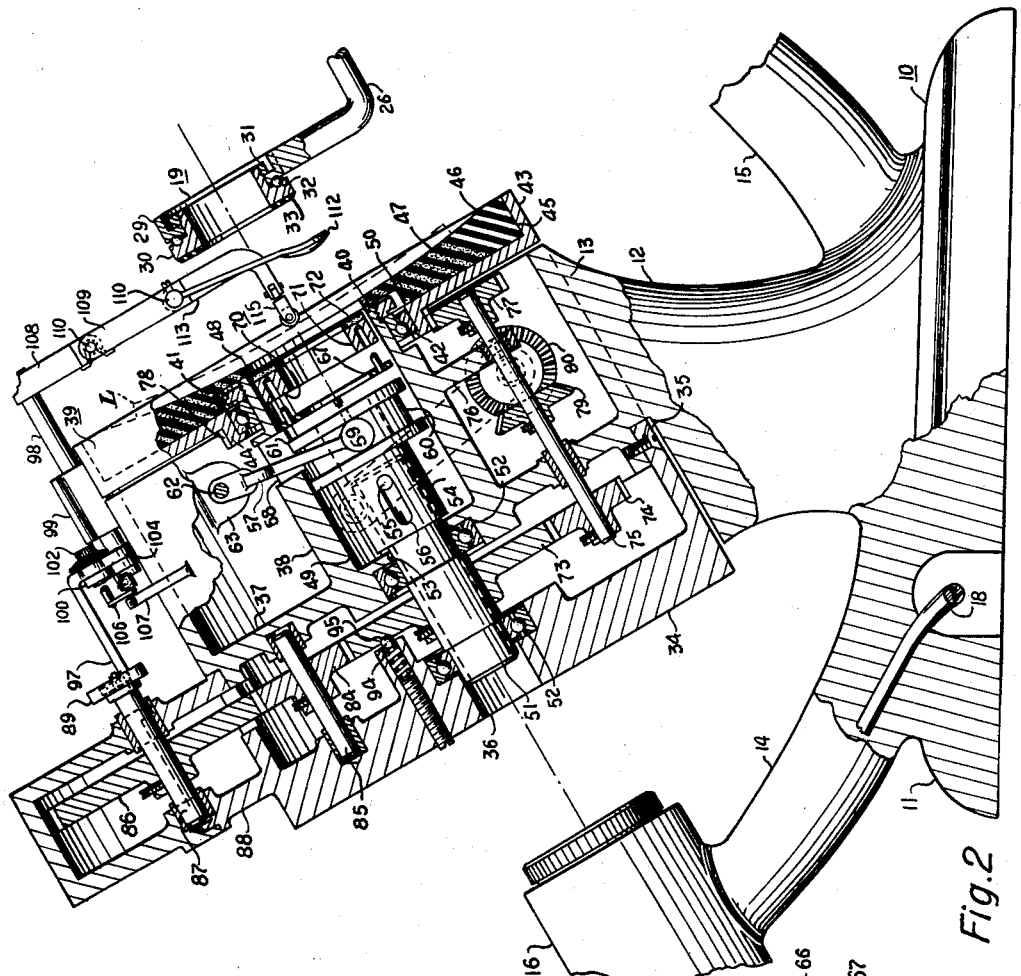
Figures 9, 10:
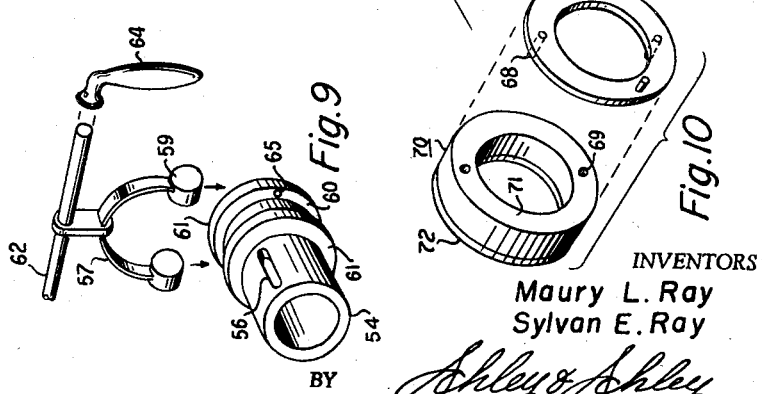
Figures 4, 5, 6, 7:
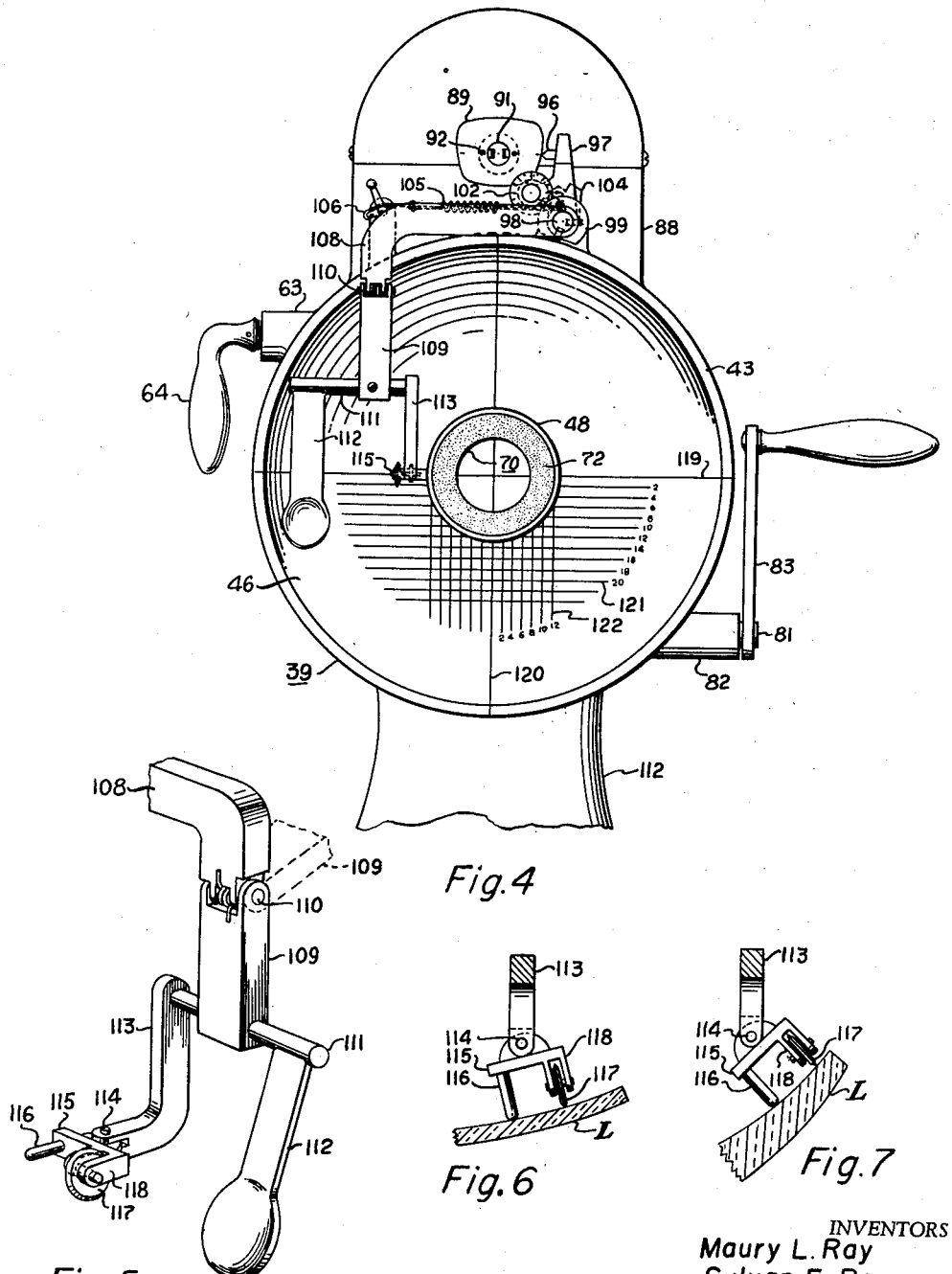

The invention will be more readily understood from a reading of the following specification and by reference to the accompanying drawings, wherein an example of the invention is shown, and wherein:

Fig. 1 is a perspective view of an optical lens scribing instrument constructed in accordance with the invention, Fig. 2 is a side elevational view, partly in section, showing the lens mounting and scribing means with the chuck and its adapter separated from its actuating means, Fig. 3 is a view, similar to Fig. 2, showing the lens clamped in position for scribing, Fig. 4 is a front elevational view of the scriber housing, Fig. 5 is an enlarged, perspective view of the cutting head mounting of the scribing means, Figs. 6 and 7 are enlarged views, partly in section, showing the pivotal movement of the cutting head during scribing, Fig. 8 is a rear perspective view showing the relationship of the scribing and guide means, Fig. 9 is an exploded, perspective view of the chuck actuating means, Fig. 10 is a perspective view of the lens chuck and its adapter, Fig. 11 is a cross-sectional view, taken on the line 11—11 of Fig. 3, showing the mounting of a lens scribing pattern.

In the drawings, the numeral 10 designates an optical lens scribing instrument embodying the principles of the invention and including a circular base 11 having an axial, upstanding pedestal 12 for supporting a cylindrical scriber housing 13 at an inclination. A pair of bowed or curved, diametrically-opposed arms 14 and 15 extend outwardly and upwardly from the lower portion of the pedestal 12 for supporting the usual lens system or element 16 and eyepiece 17 of a conventional lens meter in axial alinement with the longitudinal axis of the housing 13. It is believed unnecessary to describe the lens meter since its construction is well known and forms no part of the present invention. As shown in Figs. 1 and 2, an electrical lead wire 18 extends through the base 11 and arm 14 to provide a light source for the lens element 16.

A clamp 19 is provided for holding a lens, shown by the broken lines L, in engagement with the front, upper end of the scriber housing adjacent the eyepiece 17 and is adjustably supported by an elongated boss 20 which projects rearwardly from the arm 15 immediately below and in parallel relation to said eyepiece. The boss 20 has a cylindrical bore 21 for slidably supporting a complementary rack or pin 22 which has its serrated inner end portion meshing with an underlying pinion 23 housed within said boss (Fig. 3). An angular rod or shaft 24 is journaled in the boss for rotatably supporting the pinion 23 and permitting manual rotation thereof and reciprocation of the rack 22 toward and away from the housing 13. An axial bore 25 is formed in the outer end of the rack for rotatably supporting an angular arm or rod 26 which is held against rotation by the coaction of a recess 27 in its inner end portion with a spring-pressed ball or detent 28 carried by said rack.

As shown most clearly in Fig. 2, the outer end of the angular arm 26 is enlarged to provide an annular head or collar 29 which is angular in cross-section and has external, axial and internal, radial flanges. An annular, complementary clamp member or ring 30, having external, radial and internal, axial flanges, is rotatably supported by the collar 29 and is confined against displacement by a suitable nut or retainer 31 screw-threaded on the end of its internal, axial flange and overlying the internal, radial flange of said collar. Preferably, ball bearings 32 are interposed between the radial flanges of the collar and ring to facilitate rotation of the ring with the lens L. In order to prevent marring of the lens, an annular cushion 33 of rubber or other suitable material is carried by the outer face of the ring 30. The latter is adapted to be moved into and out of engagement with the concave surface of the lens by inward and outward reciprocation of the arm 26 with the rack member 22 and is adapted to be swung into and out of alinement with the longitudinal axis of the housing 13 and eyepiece 17 by rotation of said arm relative to said rack.

A circular, flanged end plate or cap 34 is removably secured to the rear, lower end of the scriber housing by suitable screws 35 and has an axial opening 36 alined with the common longitudinal axis of said housing, lens element 16 and eyepiece 17 (Figs. 2 and 3). Inwardly of the end plate 34, the housing has an annular, transverse partition or wall 37 and an axial, cylindrical sleeve or inner housing 38 extending forwardly from the partition beyond the front, upper end of said housing. An annular, flanged lens support or table 39, of a diameter substantially equal to the diameter of the scriber housing, is rotatably confined upon the reduced outer end 40 of the sleeve 38 by a screw-threaded retainer or nut 41 and a ball bearing assembly 42. The table 39 has an external, axial flange 43 directed outwardly and an internal, axial flange 44 extending inwardly and journaled on the ball bearing assembly 42. This construction provides a recess 45 in the outer face of the table for receiving an annular grid member or pad 46 of rubber or other suitable elastic material. Although the pad 46 will be further described, it has a concave outer surface 47 for engagement by the convex surface of the lens L and an axial opening 48 of substantially the same diameter as the bore 49 of the sleeve 38 whereby the inner peripheral portion of said pad overlies the outer end of said sleeve and its nut 41. If desired, the pad may be recessed as shown at 50 to accommodate the sleeve outer end and its nut.

A tubular shaft 51 is journaled by a pair of ball bearing assemblies 52 in the bore 36 of the rear end plate 34 and the axial bore 53 of the partition 37 (Figs. 2 and 3). The shaft extends into the bore 49 of the sleeve 38 and has a cylindrical chuck-actuating member or tube 54 slidably confined upon its front or inner end by means of a pin 55 on said shaft and a slot 56 extending longitudinally of the tube. For reciprocating the tube 54 while permitting rotation thereof with the shaft 51, a yoke 57 depends through an opening 58 in the top of the sleeve and has a pair of cylindrical gudgeons or trunnions 59 for engaging an annular channel or race 60 formed on the front or inner end of the tube by a pair of radial flanges 61 (Fig. 9). The yoke 57 is fixed to a rod or shaft 62 extending transversely of the scriber housing above the sleeve and journaled in suitable bosses 63. A handle 64 is carried by one end of the rod 62 for rocking the yoke and reciprocating the tube 54 relative to the shaft 51. Due to the cylindrical gudgeons 59 and annular race 60, the tube may freely rotate with the shaft relative to the yoke.

As shown most clearly in Fig. 9, one or more openings 65 extend axially through the endmost flange 61 for engagement by the complementary pin or pins 66 of an annular chuck adapter or ring 67 which is slidable in the bore 49. The chuck adapter 67 is relatively thin and has diametrically-opposed pins 68 extending axially from its front surface for engagement with complementary openings 69 formed in the rear surface of an annular chuck 70 slidably mounted in the front or outer end of the sleeve bore (Fig. 10). The chuck 70 includes a collar or relatively thick ring 71 having an outer or front face 72 of suitable adhesive or pressure-sensitive material for adhering to the convex surface of the lens L. As will be explained, the chuck is adapted to be withdrawn from the bore 49 upon removal of the lens from the table 39. It is noted that the chuck is of the type used for supporting the lens in an automatic edger (not shown) and that its construction, particularly its openings 69, may vary with edgers of different manufacture. As a result, the adapter 67 is removable from the bore for replacement by modified adapters. As shown in Fig. 3, the chuck and its adapter with the tube 54 are reciprocated outwardly or forwardly by counter-clockwise rocking of the yoke 57 and the adhesive face 72 of said chuck engages and adheres to the convex surface of the lens when it is held in engagement with the pad by the clamp 19.

For imparting rotation to the tubular shaft 51, a gear 73 is fixed thereon between the end plate 34 and partition 37 and has its teeth in constant mesh with the teeth of an underlying pinion 74 which is mounted on the rear end of a drive shaft 75 extending longitudinally of the housing 13 in parallel relation to said shaft 51 (Fig. 2). A hanger 76 depends from the medial portion of the sleeve 38 for supporting the drive shaft 75 is cooperation with the partition, said shaft being journaled in and extending through said partition and hanger. The drive shaft has a pinion 77, of the same diameter as the pinion 74, fixed on its front end adjacent the lens supporting table 39 with its teeth in constant mesh with external teeth formed on the periphery of the flange 50 of said plate. A bevelled pinion 79 is fixed on the medial portion of the drive shaft for meshing with a complementary pinion 80 carried by a shaft 81 extending transversely of the scriber housing. As shown in Figs. 1 and 4, the shaft 81 is journaled in a suitable boss 82 and projects externally of the housing and carries a crank 83 for imparting rotation to the bevelled gears 80 and 79, drive shaft 75 and pinions 74 and 77. The flange 50 of the plate 39, with its gear teeth 78, is of the same diameter as the gear 73 whereby said plate and its pad 46 are rotated at the same rate of speed as the tubular shaft 51 and its tube 54. Of course, the chuck adapter 67 and chuck 70 turn with the tube and said chuck coacts with the pad to impart rotation to the clamped lens L and the engaged clamp ring 30. In actual practice, the chuck adapter is connected to the tube and the chuck to said adapter by the pins 66 and 68 and are not separated as shown in Fig. 2 except upon removal from the bore 49.

An overlying, idler pinion 84, of the same diameter as the pinions 74 and 77, meshes with the gear 73 and is fixed on a shaft 85 extending between and journaled in the end plate 34 and partition 37 in parallel relation to the shaft 51. The teeth of the idler pinion 84 mesh with the teeth of an overlying gear 86 which is of the same diameter as the gear 73 and which is mounted on a longitudinal shaft 87 journaled in an upstanding extension 88 of the end plate 34. As shown most clearly in Fig. 11, a lens pattern 89 is adapted to be detachably connected to the outer end of the shaft 87 which projects through the front of the extension 88. The shaft has an axially-extending spring-clip 90 for frictional engagement with an opening 91 formed centrally of the pattern which is held against rotation by alining pins 92 on said shaft and complementary openings 93 in said pattern. Due to this arrangement, the pattern 89 turns with and at the same rate of speed as the table 39 and chuck 70 is adapted to control the scribing of the clamped lens L.

In order to make certain that the horizontal axis of the pattern is alined with the horizontal axis of the lens, a spring-pressed ball or detent 94 is carried by the end plate 34 for engagement with a complementary recess 95 in the gear 73. When the detent 94 is engaged with the recess 95, the alining pins 92 of the shaft 87 are disposed in horizontal alinement (Figs. 4 and 11) and the horizontal lines of the grid pad 46 extend horizontally.

A follower 96 is provided for riding on the periphery of the pattern 89 and is carried by the rear end of an angular, longitudinally-extending guide arm 97 (Fig. 8). The front end of the arm 97 is journaled on the rear end of a longitudinal shaft 98 which is journaled in a pillow-block 99 upstanding from the housing 13. A cam 100 is rotatably supported on the guide arm by a longitudinal stub shaft 101 which carries a dial 102 for indicating the position of the cam. For supporting a cam follower 103, a sizing arm 104 is fixed on the rear end of the shaft and is connected by a tension spring 105 to a toggle latch 106 which is pivotally mounted on a lug 107 upstanding from the scriber housing. When the spring 105 is placed under tension by counter-clockwise pivoting of the latch 106, the sizing arm 104 is swung counter-clockwise to move its follower 103 into engagement with the cam 100. Since the cam is carried by the guide arm 97, said arm is swung counter-clockwise to engage its follower 96 with the periphery of the pattern. It is noted that the sizing arm controls the rotational movement of the shaft 98 and the shape of the lens to be scribed in accordance wtih the contour of the pattern and that size may be varied by adjusting the cam.

The scribing means is actuated by the shaft 98 and includes an angular supporting arm 108 fixed on the front end of said shaft. As shown in Figs. 3 and 5, the outer, depending end portion 109 of the arm 108 is articulated and has a spring-pressed hinge connection 110 for urging said end portion upwardly out of the way. A transverse rod 111 is carried by the end portion 109 and projects from each side thereof for supporting a thumb lever 112 on one end and an angular arm 113 on its opposite end. The arm 113 has its lower portion extending at substantially a right angle to the arm portion 109 and carries a pivot pin 114 extending in parallel relation to said arm portion for pivotally supporting a cutting or scribing head 115. A guide pin 116 depends from one end of the head 115, which extends transversely of the arm 113, and a cutting or scribing wheel 117 is journaled between a pair of legs 118 depending from the opposite end of said head. As shown in Figs. 6 and 7, the pivotal mounting of the scribing head permits its wheel 117 to follow the concave surface of the lens L and the guide pin 116 maintains said wheel in upright relation to said surface. It is noted that the rod 111 is fixed to the arm portion 109 so that the pivotal movement of said arm portion controls the movement of the scribing head toward and away from the lens.

As shown in Fig. 4, the grid pad 46 has horizontal and vertical axis lines 119 and 120 which coincide with the horizontal and vertical axis of the lens meter. A plurality of horizontal grid lines 121 and vertical lines 122 are provided on the pad for laying out the decentration of a bifocal or trifocal lens. The bifocal center of a lens is marked and positioned in accordance with the prescription by means of the horizontal and vertical grid lines 121 and 122. In any event, the lens is positioned optically with the geometric center of the finished lens or the lens to be scribed in alinement with the common longitudinal axes of the lens meter and scriber housing 13. In addition to neutralizing the lens into its proper axis, its focal power is checked by the lens meter in the usual manner. After this positioning, the lens is held against accidental displacement by the clamp 19 as shown in Fig. 3.

After positioning of the lens with the detent 94 engaging its recess, the handle 64 is swung forwardly to rock the shaft 62 and the yoke 57 and reciprocate the tube 54 and chuck adapter 67 forwardly of the bore 49 for moving the chuck 70 into engagement with the convex surface of the lens L. Due to its adhesive face 72, the chuck is attached to said lens. Preferably, the chuck adapter and tube are held forwardly during the complete operation whereby the chuck coacts with the clamp 19 to prevent displacement of the lens. Since the clamp and chuck are substantially complementary, the chuck opposes the pressure exerted by said clamp to prevent accidental breaking of the lens. Either before or after the positioning of the lens, the desired pattern 89 is mounted on the shaft 87, the cam 100 is adjusted by the dial 102 in accordance with the desired size and the latch 106 is actuated to place the spring 105 under tension and engage the followers 96 and 103. The scribing head 115 is swung downwardly to engage its guide pin 116 and cutting wheel 117 with the lens, the pressure of the engagement being controlled by the thumb lever 112. Then, the crank 83 is turned to rotate the pattern and the grid pad 46 with the clamp lens.

The cutting wheel traverses a path identical to the contour of the pattern and pivots in accordance with the curvature of the lens, being maintained in substantially perpendicular relation to the concave surface of said lens by the guide pin. Upon completion of a full revolution, the detent 94 re-engages the recess 95 to produce a click, which may be heard or felt, to indicate the completion of the revolution. The scribing means is released and swings upwardly and the clamp 19 retracted and, if desired, may be swung to one side. When the lens is removed from the grid pad 46, the chuck 70 is withdrawn from the bore 49 due to its attachment to said lens by its adhesive face 72. This withdrawal may be assisted by moving the tube 54 and adapter 67 forwardly to eject said chuck. The scribed lens is chipped to remove the excess glass without separating the chuck from said lens. Since the chuck is constructed to fit the automatic edger which will be utilized, it is unnecessary to re-aline the horizontal axis of the lens and it is only necessary to insert the chuck and lens in said edger. Since the chuck preserves the alinement of the lens, the latter may be scribed to a closer tolerance so that less time will be required to edge said lens.

It is pointed out that the lens is chucked optically, whereby re-alining, dotting, marking and manual chucking are not required. As a result, greater accuracy is obtained because there is less chance for mistakes. This is an important advantage due to the fact that the lens is usually handled by several persons during the conventional scribing and edging of the same. Considerable time is saved because it is unnecessary to dot and mark the lens along its horizontal axis or to re-aline the lens for chucking in an automatic edger. Instead, the neutralization of the lens, its laying out, chucking and scribing are performed in one instrument without removal therefrom and in a minimum amount of time. In addition, the edging time is reduced due to the accuracy of optical chucking. It is noted that the axial bores or openings of the shaft 51, tube 54, adapter 67 and chuck 70 are of sufficient diameter to prevent interference with the lens meter.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. In combination with a lens meter having an eyepiece and a lens system, an instrument for scribing a lens including rotatable lens supporting means interposed between the eyepiece and lens system and having an axial opening in alinement with the longitudinal axis of the lens meter whereby the geometric center of a lens to be scribed may be centered with the rotational axis of its supporting means, lens pattern supporting means rotatable about an axis parallel to the rotational axis of the lens supporting means, a lens chuck mounted in the opening for movement longitudinally thereof having means for attachment to the optically centered lens in axial relationship, means for moving the chuck through said opening into engagement with the lens for attachment and removal therewith, means for synchronously rotating the pattern and lens supporting means, scribing means mounted on said housing for cutting the lens, and means engaging the pattern and having connection with the scribing means for guiding said means in accordance with the contour of said pattern.

2. The combination set forth in claim 1 wherein the lens chuck includes a ring having a face of adhesive material for adhering to the lens so as to assist in holding the lens in engagement with the lens supporting means.

3. The combination as set forth in claim 1 including a clamp for holding the lens in engagement with the lens supporting means, the chuck moving means including means for holding the lens chuck in engagement with the lens whereby the lens is clamped between said chuck and clamp.

4. The combination set forth in claim 1 including removable adapter means interposed between and detachably connecting the chuck and its moving means.

5. The combination set forth in claim 1 wherein the chuck moving means includes a cylindrical member axially alined with the longitudinal axis of the lens meter and rotatable with the pattern and lens supporting means.

6. In combination with a lens meter having an eyepiece and a lens system, an instrument for scribing a lens including a housing interposed between the eyepiece and lens system and having a through opening in axial alinement with the longitudinal axis of the lens meter, lens supporting means rotatably mounted on the housing and having a co-axial opening whereby the geometric center of a lens to be scribed may be centered with the rotational axis of its supporting means, means on said housing supporting a lens pattern for rotation about an axis parallel to the rotational axis of the lens supporting means, a lens chuck slidably mounted in the housing opening and having means for attachment to the optically centered lens in axial relationship, a chuck actuating member reciprocable in said housing opening for moving the chuck through the opening of said lens supporting means into engagement with the lens for attachment and removal therewith, said chuck and member having openings axially alined with said housing opening, means for synchronously rotating the pattern and lens supporting means, scribing means mounted on said housing for cutting the lens, and means engaging the pattern and having connection wtih the scribing means for guiding said means in accordance with the contour of said pattern.

7. The combination set forth in claim 6 wherein the chuck actuating member is rotatable with the pattern and lens supporting means, and means detachably connecting the chuck and member whereby said chuck is rotatable therewith.

References Cited in the file of this patent

UNITED STATES PATENTS

| | | |
|---|---|---|
| 1,931,477 | Allen | Oct. 24, 1933 |
| 2,042,565 | Tillyer | June 2, 1936 |
| 2,166,037 | Campos | July 11, 1939 |
| 2,522,818 | Geula | Sept. 19, 1950 |
| 2,604,697 | Aulin | July 29, 1952 |
| 2,765,523 | Vaughan | Oct. 9, 1956 |